United States Patent

[11] 3,593,049

| [72] | Inventors | Werner Dittrich<br>Nurnberg;<br>Klaus-Dieter Wahnschaffe, Datzwang, both of, Germany |
|---|---|---|
| [21] | Appl. No | 863,764 |
| [22] | Filed | Oct. 2, 1969 |
| [45] | Patented | July 13, 1971 |
| [73] | Assignee | Siemens Aktiengesellschaft<br>Berlin, Germany |
| [32] | Priority | Dec. 1, 1965 |
| [33] | | Germany |
| [31] | | 100741 |
| | | Continuation of application Ser. No. 597,719, Nov. 29, 1966, now abandoned. |

[54] DC MIDGET MOTOR FREE OF COMMUTATOR AND SLIP RINGS
12 Claims, 4 Drawing Figs.

[52] U.S. Cl. .................................................. 310/40,
310/89, 310/91, 310/156, 310/258
[51] Int. Cl. ....................................................... H02k 5/00,

[50] Field of Search ........................................... 310/40
MM, 89—91, 264—266, 156, 152, 216, 180, 194

[56] References Cited
UNITED STATES PATENTS

| 2,212,192 | 8/1940 | Howell | 310/156 |
| 2,450,982 | 10/1948 | O'Brier | 310/40 X |
| 2,967,346 | 1/1961 | McMaster et al. | 310/40 X |

Primary Examiner—Milton O. Hirshfield
Assistant Examiner—Mark O. Budd
Attorneys—Curt M. Avery, Arthur E. Wilfond, Herbert L. Lerner and Daniel J. Tick ABSTRACT: Midget motor free of commutator or sliprings provided with a permanent magnet system secured to the shaft of the motor, a stationary armature winding mounted on a winding frame member, and a magnetic yoke surrounding the latter. The bearings for the rotor shaft adjoin the winding frame member, which is preferably of drum-shaped construction, both bearings being located in respective hub-shaped appendages of the end walls of the winding frame member.

PATENTED JUL 13 1971     3,593,049

DC MIDGET MOTOR FREE OF COMMUTATOR AND SLIP RINGS

This application is a continuation of Ser. No. 597,719, filed Nov. 29, 1966, now abandoned.

Our invention relates to DC midget motors which do not have commutator or sliprings.

Such motors generally have a rotating permanent magnet system which cooperates with a stationary armature current system to form a turning moment or torque. The stationary armature current system usually consists of several wye-connected windings which are preferably provided on a drum-shaped winding carrier. The windings are preferably energized with a current from an electronic commutation device in such a way that a rotating stator field is formed. The speed-responsive control of the commutation device is preferably effected with the aid of galvanometric components which are located either in the airspace of the machine or in an additional control head. Either field plates (galvanometric resistors) or Hall generators can serve as galvanometric components. According to the armature current system employed, the galvanometric components required for controlling the electronic commutation device are offset from one another in a rotational range about 90° electrical or 120° electrical.

According to a prior proposal in application Ser. No. 504,308, filed Oct. 24, 1965, now abandoned, of E. Rainer and assigned to the assignee of the instant application, for the purpose of electronic armature current use or commutation, each phase of the stator winding of the DC motor is divided into two equal parts and the midpoints of these phase windings are connected to one another. Each partial winding is serially connected with the collector-emitter path of a switching transistor, the basis of a switching transistor belonging to one phase respectively being connected to one another through the Hall electrodes of a respective Hall generator and the control electrodes of the Hall generator, preferably across a resistance, in such a manner that an emitter-base current can flow across all of the switching transistors provided that one or more switching transistors are not blanked (cut off) by a suitably poled Hall voltage.

It is an object of our invention to provide a DC midget motor with a commutation device of the aforementioned type or similar fins which is of simple and inexpensive construction. More specific objects of the invention fins to provide such a motor having a relatively short axial length and having bearings more readily accessible in the interior of the winding frame member.

With the foregoing and other objects in view, we provide in accordance with our invention a midget motor free of commutator or sliprings having a permanent magnet system secured to the shaft of the motor, a stationary armature winding mounted on a winding frame member, and a magnetic yoke surrounding the latter. The bearings for the rotor shaft adjoin the winding frame member. The winding frame member is preferably of drum-shaped construction and both bearings are located in hub-shaped appendages of the end walls of the winding frame member.

In accordance with further features of our invention, the winding frame member is made up of two parts that are capable of being joined together in form-locking relationship. Both parts of the winding member are preferably of similar construction, at least the cylindrical part of the winding member being longitudinally divided. By employing calotte or cup-shaped bearings, they can be retained with springs which are insertably anchored, for example, in suitably formed projections of the winding member.

In accordance with yet additional features of our invention, the winding member is provided with ribs by means of which the armature winding can be duly mounted. Inasmuch as each phase of the stator winding is subdivided into two winding portions, it is advantageous for the purpose of reducing winding labor, to wind both winding portions belonging to each coil in bifilar windings.

The magnetic yoke is advantageously formed by joining together circular discs, the individual discs being joined together by suitably deforming a casing tube stuck on the discs to a rigid packet. The deformation is effected preferably by a high-speed forming process, especially a magnetic pulse-forming process. For this purpose, the discs are stuck on a mandrel so as to provide a smooth passage opening therethrough which will not require any further machining or working.

The features that are considered to be characteristic for the invention are set forth in the appended claims.

Although the invention has been illustrated and described as embodied in DC midget motor free of commutator and sliprings, it is nevertheless not intended to be limited to the details shown, since various modifications and structural changes may be made therein without departing from the spirit of the invention and within the scope and range of equivalence of the claims.

The construction and method of operation of the invention, however, together with additional objects and advantages thereof will be best understood from the following description of a specific embodiment when read in connection with the accompanying drawings, in which.

Figure 1:
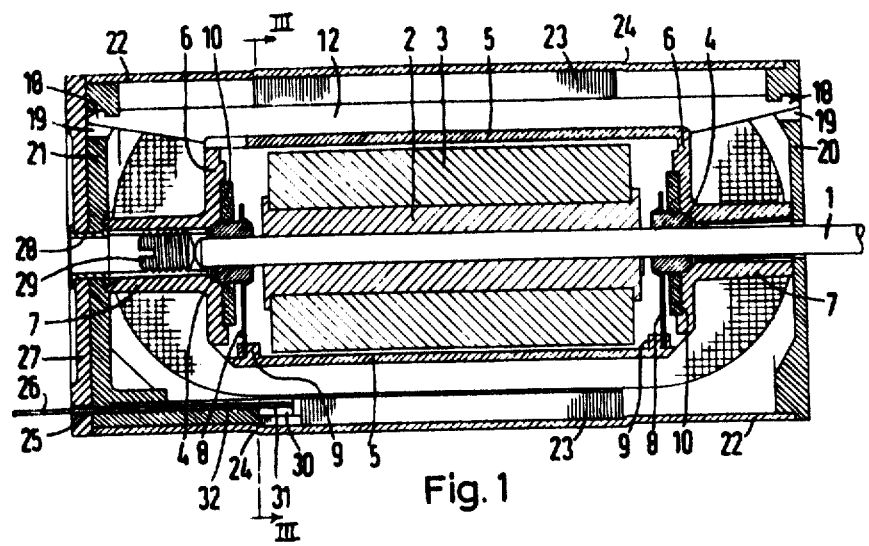
FIG. 1 is a longitudinal sectional view of the DC midget motor free of commutator and sliprings constructed in accordance with our invention.

Referring now to the drawings and first particularly to FIG. 1 thereof, there is shown a cylindrical permanent magnet member 3 mounted with the aid of a sleeve 2 on a rotor shaft 1. If desired, the magnet member can be directly mounted on the shaft. The rotor shaft 1 is journaled in calotte or cup-shaped bearings located at the end walls 6 of a winding frame member consisting of two half-shells 5 joined together. Hub-shaped inserts 7 form the end walls 6 of both winding frame member halves 5 and are constructed with a cup or calotte shape on their inner surface to accommodate the bearing 4. The bearings are held in place by leaf springs 8 whose ends are suitably clamped in projections 9 formed on the winding member halves 5. Oil-impregnated washers 10 serve as grease storage spaces.

Figure 2:
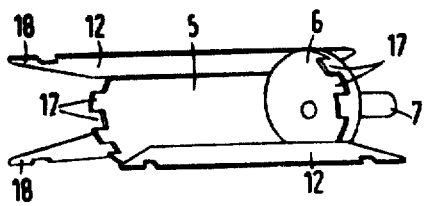
FIG. 2 is a perspective view of one-half portion of the winding member forming part of my invention.

FIG. 2 shows one of the winding member halves 5 constructed in accordance with the preferred embodiment disclosed in this application wherein each phase of the stator winding is subdivided into two component windings. As can be seen from FIG. 2, the winding member proper has four ribs 12 which afford a rigid mounting of the coil winding thereon.

Figure 3:
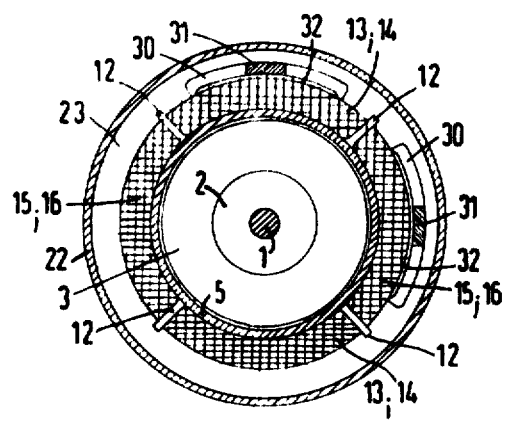
FIG. 3 is a cross-sectional view of FIG. 1 taken along the line III-III in the direction of the arrows.

FIG. 3 shows the component windings 13 and 14 of one phase and the component windings 15 and 16 of the other phase. The windings 13, 14 and 15, 16 are produced together by bifilar windings.

Both winding member halves 5 (FIG. 2) have the same construction and are able to be joined in form-locked relationship by dovetailing extensions and notches 17. Each winding member half 5, as shown in FIG. 2, has three ribs 12, two of which are located along the junction lines of the two halves. Consequently, the ribs at the junction lines can be of thinner and therefore weaker construction since they are mutually reinforced when the winding member halves 5 are joined. The ribs 12 of the winding member are extended in both axial directions and are provided at the ends thereof with nose-shaped projections 18 which can engage in suitably formed openings 19 (FIG. 1) of two connecting plates 20 and 21. The ribs 12 and the hub-shaped portions 7 are so coordinated that the plates 20 and 21 abut against the free ends of the hub portions 7.

The plate-shaped members 20 and 21 support a casing tube 22 wherein a magnetic yoke 23 is located. The magnetic yoke 23 consists of individual circular washers or ring-shaped discs, formed especially by stamping, which are slipped over a mandrel and, by suitably deforming the casing tube are joined into a rigid packet. The constrictions, depressions or the like 24 which bind the circular washers in the casing tube are produced by the deforming operation which can be suitably effected by applying pressure. A magnetic forming process can preferably be employed for this purpose.

Figure 4:
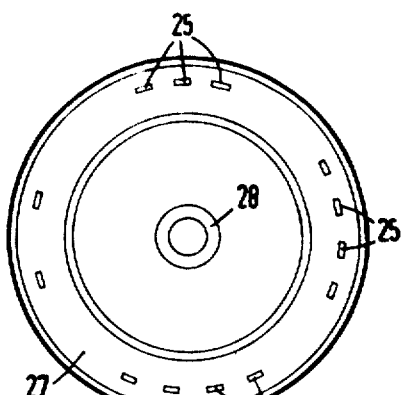
FIG. 4 is a view of the left-hand end of FIG. 1.

The plate 21 has the construction of a connector support and is accordingly provided with openings 25 (FIG. 4) through which the connector fins 26 are insertable. The openings 25 are preferably shaped so that the connector fins 26 are retained securely because of their suitably shaped crimps or folds, for example with the aid of a closure disc 27. The plates or discs 21 and 27 are held together by the tubular rivet 28. A worm screw 29 threadable in the hub-shaped portion 7 serves for adjusting axial play.

As shown in FIGS. 1 and 3, a portion of the plates forming the magnetic yoke 23 is provided with recesses 30 that are offset substantially 90° from one another, galvanomagnetic elements 31, such as Hall generators especially, being losated in said recesses 30. The Hall generators 31 are preferably disposed on a ferromagnetic support 32, a so-called collector sheet which is secured preferably by the interlocking shape thereof with the connector support 21, for example.

Assembly of the motor is effected in a manner that the shaft carrying the permanent magnets 2 is inserted into the bearings 4 when both halves 5 of the winding frame member are being joined together. The calotte bearings 4 are previously secured in the end walls 6 of the winding frame halves 5 with the aid of the leaf springs 8. After the winding frame halves 5 have been fitted together by form-locking, the assembled winding frame member is twice wound with a bifilar or two-wire winding in the aforedescribed manner. The completed winding is then further processed in a conventional manner.

Independently of the foregoing assembly steps, the ring-shaped discs 23 forming the magnetic yoke of the motor are slipped on a mandrel and, by suitably deforming the casing tube 24 in a magnetic forming process, for example, are united into a single packet of plate laminations.

Also independently of the foregoing assembly steps, the connector support 1 is assembled with both Hall generators 31, capture plates 32 and connector fins 26, and closure discs or plates 27 are then superimposed thereon. The soldered junctions are thereafter formed and the casing tube 22 with the yoke member 23 are slipped over the winding so that the noses 18 of the ribs 12 engage in the corresponding openings 19 of the connector support 21. The closure disc 20 is then superimposed so that the noses 18 of the ribs 12 are inserted in the corresponding openings 19 thereof. In this manner, the entire motor is thus held form-locked together.

I claim:

1. DC midget motor free of commutator and sliprings, comprising a shaft for the motor, a permanent magnet system mounted on said shaft, a stationary armature winding mounted on a winding frame member and surrounding said permanent magnet system, a magnetic yoke surrounding said armature winding, and bearings for said shaft adjoining said winding frame member, said magnetic yoke including a casing tube for the motor, plate members located at the ends of said casing tube, and said winding frame member having a plurality of longitudinally extending ribs in form-locking engagement with said end plate members.

2. DC midget motor according to claim 1, wherein said winding frame member is of bipartite construction, both parts thereof being joinable interlockingly.

3. DC midget motor according to claim 1, wherein said winding frame member consists of two interlocking parts, both of said parts being of substantially identical construction.

4. DC midget motor according to claim 1, wherein said winding frame member has a cylindrical portion, at least said cylindrical portion of said winding frame member being longitudinally divided.

5. DC midget motor according to claim 1, wherein said winding frame member is of drum-shaped construction and has end walls, said bearings for said shaft being calotte bearings located at the inner surface of said end walls, said winding frame member being formed with projections adjacent said bearings, and leaf spring means insertably anchored in said projections being engageable with said bearings for biasing said bearings against the respective end walls of said winding frame member.

6. DC midget motor according to claim 1, wherein said stationary winding has a plurality of phases each of which is subdivided into two component windings, said component windings of each phase being bifilar.

7. DC midget motor according to claim 1, wherein said magnetic yoke comprises a plurality of annular discs joined together.

8. DC midget motor according to claim 1, wherein said magnetic yoke comprises a plurality of axially aligned annular discs received in a tubular member coaxial therewith, said discs being joined together by deformation of said tubular member to form a packet of disc laminations.

9. DC midget motor according to claim 1, wherein one of said two end plate members is in the form of a connector support.

10. DC midget motor according to claim 9, including connector fins held in form-locking engagement in said connector support by crimps formed therein.

11. DC midget motor according to claim 9, including connector fins held in form-locking engagement in said connector support by folds formed therein.

12. DC midget motor according to claim 9, wherein said connector support is provided with ribs for securing at least one ferromagnetic collector sheet in form-locking engagement.